(12) United States Patent
Aratake et al.

(10) Patent No.: US 10,173,686 B2
(45) Date of Patent: Jan. 8, 2019

(54) CONTROL DEVICE FOR MULTI-DISC LOCK-UP CLUTCH

(71) Applicant: TOYOTA JIDOSHA KABUSHIKI KAISHA, Toyota-shi, Aichi-ken (JP)

(72) Inventors: Hironobu Aratake, Chiryu (JP); Norihiro Tsukamoto, Toyota (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 15/440,423

(22) Filed: Feb. 23, 2017

(65) Prior Publication Data
US 2017/0253249 A1    Sep. 7, 2017

(30) Foreign Application Priority Data
Mar. 4, 2016    (JP) .................. 2016-042273

(51) Int. Cl.
*B60W 10/02*    (2006.01)
*F16D 48/06*    (2006.01)
(Continued)

(52) U.S. Cl.
CPC .......... *B60W 30/20* (2013.01); *B60W 10/026* (2013.01); *B60W 10/11* (2013.01); *F16D 48/06* (2013.01); *B60W 2030/203* (2013.01); *B60W 2050/0094* (2013.01); *B60W 2510/0233* (2013.01); *B60W 2510/10* (2013.01); *B60W 2520/10* (2013.01); *B60W 2710/024* (2013.01); *B60W 2710/10* (2013.01); *B60Y 2300/427* (2013.01); *F16D 13/52* (2013.01); *F16D 25/0638* (2013.01); *F16D 2500/108* (2013.01);
(Continued)

(58) Field of Classification Search
None
See application file for complete search history.

(56) References Cited

U.S. PATENT DOCUMENTS 5,611,750 A * 3/1997 Kono .................... F16H 61/143
477/169
2003/0036458 A1* 2/2003 Tabata .................. B60W 10/06
477/107
(Continued)

FOREIGN PATENT DOCUMENTS

JP    H10-267119 A    10/1998
JP    2012-026460 A    2/2012

OTHER PUBLICATIONS

Matsubara et al. U.S. Appl. No. 15/432,231, filed Feb. 14, 2017.

*Primary Examiner* — Justin Holmes
(74) *Attorney, Agent, or Firm* — Oliff PLC

(57) ABSTRACT

Lock-up clutch engagement hydraulic pressure learning control can be precisely performed by starting lock-up clutch engagement control and executing the lock-up clutch engagement hydraulic pressure learning control after execution of shift control is completed, in a case where the lock-up clutch engagement control is limited in a shift stage before execution of the shift control, when the shift control is executed in a state where a multi-disc lock-up clutch is released. Meanwhile, a decrease in fuel efficiency performance and a direct steering feeling is minimized by starting the lock-up clutch engagement control during shift control in a case where the lock-up clutch engagement control is not limited.

3 Claims, 10 Drawing Sheets

(51) Int. Cl.
*B60W 30/20* (2006.01)
*B60W 10/11* (2012.01)
*F16D 13/52* (2006.01)
*F16H 45/02* (2006.01)
*F16D 25/0638* (2006.01)
*B60W 50/00* (2006.01)

(52) U.S. Cl.
CPC .............. *F16D 2500/10412* (2013.01); *F16D 2500/3108* (2013.01); *F16H 45/02* (2013.01); *F16H 2045/0284* (2013.01); *F16H 2200/006* (2013.01)

(56) References Cited

U.S. PATENT DOCUMENTS

2005/0222738 A1* 10/2005 Imamura ............... F16H 61/143
    701/67
2010/0145584 A1* 6/2010 Kojima ................ F16H 61/143
    701/68
2010/0167871 A1* 7/2010 Inagaki .................... B60K 6/48
    477/5

* cited by examiner

FIG. 2

|     | C1 | C2 | C3 | C4 | B1 | B2 |
|-----|----|----|----|----|----|----|
| 1st | ○  | —  | —  | —  | —  | ○  |
| 2nd | ○  | —  | —  | —  | ○  | —  |
| 3rd | ○  | —  | ○  | —  | —  | —  |
| 4th | ○  | —  | —  | ○  | —  | —  |
| 5th | ○  | ○  | —  | —  | —  | —  |
| 6th | —  | ○  | —  | ○  | —  | —  |
| 7th | —  | ○  | ○  | —  | —  | —  |
| 8th | —  | ○  | —  | —  | ○  | —  |
| Rev | —  | —  | ○  | —  | —  | ○  |

LOCK-UP OFF

CONTROL DEVICE FOR MULTI-DISC LOCK-UP CLUTCH

INCORPORATION BY REFERENCE

The disclosure of Japanese Patent Application No. 2016-042273 filed on Mar. 4, 2016 including the specification, drawings and abstract is incorporated herein by reference in its entirety.

BACKGROUND

1. Technical Field

The present embodiment relates to a control device for a lock-up clutch to be applied to a multi-disc lock-up clutch provided in a transmission for a vehicle.

2. Description of Related Art

In control of a multi-disc lock-up clutch provided in a transmission for a vehicle, in a case where shift control of a transmission and lock-up clutch engagement control overlap each other in execution timing, a shock is suppressed by delaying the lock-up clutch engagement control till the completion of shifting (for example, refer to Japanese Patent Application Publication No. 10-267119). Additionally, in the control of the multi-disc lock-up clutch, lock-up clutch engagement hydraulic pressure learning control (hereinafter simply referred to as "learning control") in which hydraulic pressure is learned such that the packing time until clutch torque capacity is given becomes a target time is performed during the lock-up clutch engagement control.

SUMMARY

By the way, in a case where the shift control and the lock-up clutch engagement control overlap each other in the execution timing, if the lock-up clutch engagement control is delayed with respect to the shift control, a decrease in fuel efficiency performance and a direct steering feeling equivalent to the engagement delay occurs whenever shifting is performed.

Meanwhile, if the lock-up clutch engagement control is executed during the shift control, the fuel efficiency performance and the direct steering feeling are improved. However, since the learning control accompanying the lock-up clutch engagement control and the shift control overlap each other. As a result, the turbine speed of the multi-disc lock-up clutch on an output side (the turbine speed of a torque converter) fluctuates during the shift control. Therefore, the learning control may be unable to be precisely performed.

The embodiment has been made in consideration of such circumstances, and provides a control device for a lock-up clutch that can suppress a decrease in fuel efficiency performance and a direct steering feeling while guaranteeing the precision of lock-up clutch engagement hydraulic pressure learning control, by appropriately controlling the start timing of lock-up clutch engagement control with respect to shift control.

The embodiment is premised on a control device for a lock-up clutch to be applied to a multi-disc lock-up clutch provided in a transmission for a vehicle.

Such a control device for a lock-up clutch includes shift control means for performing shift control of the transmission, lock-up clutch engagement control means for controlling engagement of the multi-disc lock-up clutch, and lock-up clutch engagement hydraulic pressure learning control means for learning the engagement hydraulic pressure of the multi-disc lock-up clutch. In a case where the lock-up clutch engagement control means limits the lock-up clutch engagement control in a shift stage before execution of shift control when the shift control is executed by the shift control means in a state where multi-disc lock-up clutch is released, lock-up clutch engagement control using the lock-up clutch engagement control means is started and lock-up clutch engagement hydraulic pressure learning control using lock-up clutch engagement hydraulic pressure learning control means is performed, after the execution of the shift control is completed. In a case where the lock-up clutch engagement control is not limited, the lock-up clutch engagement control using the lock-up clutch engagement control means is started during the shift control. The aspect of the embodiment can also be defined as follows. There is provided a control device for a multi-disc lock-up clutch provided in a transmission of a vehicle. The control device includes an electronic control unit configured to i) perform shift control of the transmission, ii) control engagement of the multi-disc lock-up clutch, iii) a) start the engagement control of the multi-disc lock-up clutch and b) learn engagement hydraulic pressure of the multi-disc lock-up clutch, after execution of the shift control is completed in a case where the electronic control unit limits engagement control of the multi-disc lock-up clutch in a shift stage before the execution of the shift control, when the shift control is executed in a state where the multi-disc lock-up clutch is released, and iv) start the engagement control of the multi-disc lock-up clutch during the shift control in a case where the electronic control unit does not limit the engagement control of the lock-up clutch in a shift stage before the execution of the shift control, when the shift control is executed in a state where the multi-disc lock-up clutch is released.

Here, engagement prohibition and slip amount limit of the multi-disc lock-up clutch are included in the limit of above lock-up clutch engagement control.

In the present embodiment, in a case where the lock-up clutch engagement control is temporarily limited in a shift stage before the shift control, when the shift control is executed in a state where the multi-disc lock-up clutch is released, the lock-up clutch engagement control is started and the lock-up clutch engagement hydraulic pressure learning control is executed after the execution of the shift control is completed. Thus, the lock-up clutch engagement hydraulic pressure learning control can be precisely performed. Moreover, since the lock-up clutch engagement control is not necessarily delayed at every shift control (is executed after the shift control), a decrease in the fuel efficiency performance and the direct steering feeling can be minimized.

In this way, according to the embodiment, it is possible to make guarantee of the precision of the lock-up clutch engagement hydraulic pressure learning control compatible with suppression of the decrease in the fuel efficiency performance and the direct steering feeling.

In the embodiment, as a specific example of a case where the lock-up clutch engagement control is limited, there may be a configuration in which the lock-up clutch engagement control is limited (more specifically, the engagement of the lock-up clutch is prohibited), in a case where the multi-disc lock-up clutch is released after the lock-up clutch engagement control is performed during the driving of the vehicle, and thereafter, the predetermined vehicle speed is not exceeded (for example, in a case where congestion is assumed).

By virtue of such a configuration, for example, when acceleration is made in a situation where congestion is assumed, the lock-up clutch engagement control is delayed till the completion of the shift control only at the time of first shift control, and the lock-up clutch engagement hydraulic pressure learning control can be precisely executed, and the lock-up clutch engagement control can be executed during the shift control after that. Accordingly, a decrease in the fuel efficiency performance and the direct steering feeling can be suppressed while guaranteeing the precision of the lock-up clutch engagement hydraulic pressure learning control.

According to the control device for a lock-up clutch of the embodiment, a decrease in the fuel efficiency performance and the direct steering feeling can be suppressed while guaranteeing the precision of the lock-up clutch engagement hydraulic pressure learning control.

BRIEF DESCRIPTION OF THE DRAWINGS

Features and advantages, and technical and industrial significance of exemplary embodiments will be described below with reference to the accompanying drawings, in which like numerals denote like elements, and wherein:

FIG. 2 is an engagement table illustrating engaged states for gear stages of respective clutches and respective brakes in an automatic transmission illustrated in FIG. 1;

DETAILED DESCRIPTION OF EMBODIMENTS

Figure 1:
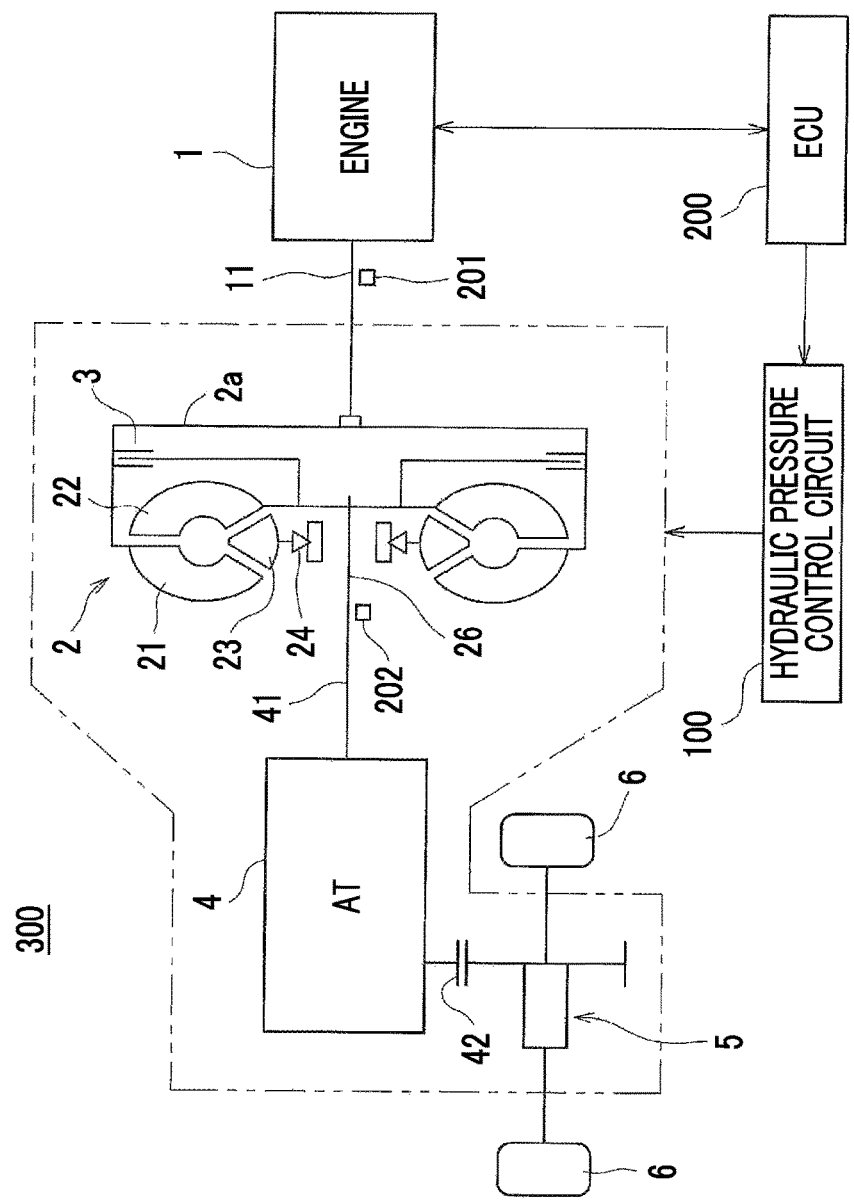
FIG. 1 is a schematic configuration diagram illustrating an example of a vehicle on which a multi-disc lock-up clutch to which the embodiment is applied is mounted.

Hereinafter, an embodiment will be described with reference to the drawings. First, an example of a vehicle on which a multi-disc lock-up clutch to which the embodiment is applied is mounted will be described with reference to FIG. 1. A vehicle 300 of this example is a FF (front engine front drive) type vehicle, and is equipped with an engine 1, a torque converter 2, a multi-disc lock-up clutch 3, an automatic transmission (AT) 4, a differential device 5, driving wheels (front wheels) 6, driven wheels (rear wheels: not illustrated), a hydraulic pressure control circuit 100, an electronic control unit (ECU) 200, and the like.

The engine 1, the torque converter 2, the multi-disc lock-up clutch 3, the automatic transmission 4, the hydraulic pressure control circuit 100, and respective parts of the ECU 200 will be described below.

The engine 1 is a source of a driving force for driving, for example, is a multi-cylinder gasoline engine. A crankshaft 11 that is an output shaft of the engine 1 is coupled to the torque converter 2. The rotational speed (engine speed ne) of the crankshaft 11 is detected by an engine speed sensor 201.

The torque converter 2 is equipped with a pump impeller 21 on an input shaft side, a turbine runner 22 on an output shaft side, a stator 23 that exhibits a torque amplification function, and a one-way clutch 24, and performs power transmission via a fluid between the pump impeller 21 and the turbine runner 22. The torque converter 2 is provided with the multi-disc lock-up clutch 3 that directly couples an input side and an output side of the torque converter 2 or couples these input and output sides in a slip state. The rotational speed (turbine speed nt) of a turbine shaft 26 of the torque converter 2 is detected by a turbine speed sensor 202.

Figure 3:
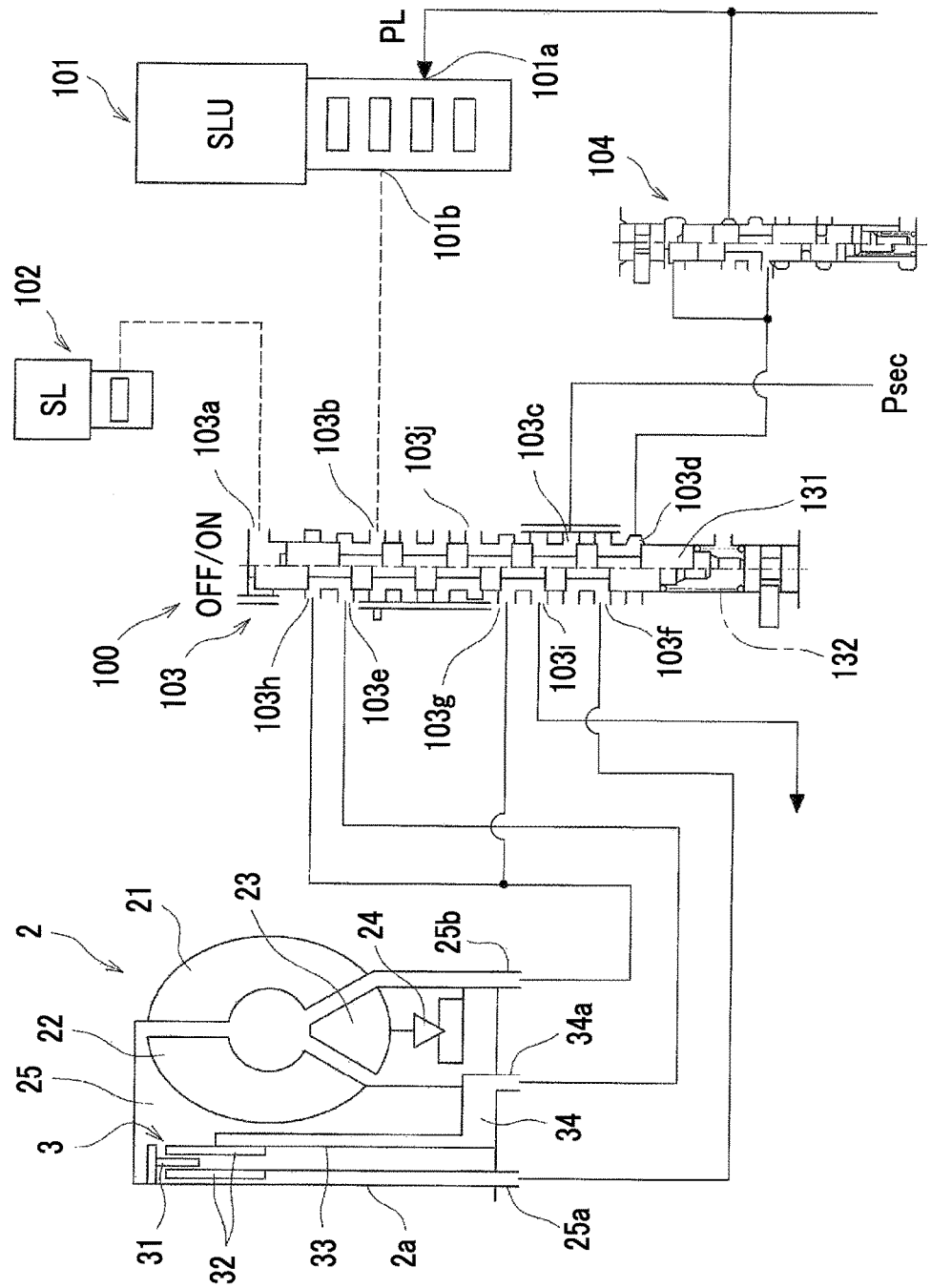
FIG. 3 is a circuit configuration view of a hydraulic pressure control circuit.

As illustrated in FIG. 3, a converter oil chamber 25 for circulation of hydraulic oil is formed inside the torque converter 2. The converter oil chamber 25 is provided with a T/C input port 25a for introducing hydraulic oil and a T/C output port 25b for discharging hydraulic oil.

As illustrated in FIG. 3, the multi-disc lock-up clutch 3 is equipped with clutch plates (frictional engagement plates) 31, 32, and a lock-up piston 33 capable of pressing the clutch plate 31 and the clutch plate 32. The clutch plate 31 is supported by a clutch hub fixed to a front cover 2a of the torque converter 2 so as to be slidable in an axial direction, and the clutch plate 32 is supported by a clutch hub connected to the turbine runner 22 so as to be slidable in the axial direction. The lock-up piston 33 is provided so as to be slidable in the axial direction inside the torque converter 2. A lock-up oil chamber 34 is formed on a back side (a side opposite to the front cover 2a) of the lock-up piston 33. The lock-up oil chamber 34 is provided with an L/U input port 34a for introducing hydraulic oil (introducing hydraulic pressure) or discharging hydraulic oil.

In the multi-disc lock-up clutch 3 having such structure, if hydraulic pressure is supplied to the lock-up oil chamber 34, the clutch plate 31 and the clutch plate 32 are engaged with each other, and the multi-disc lock-up clutch 3 is brought into an engaged state (a fully engaged state or a slip state). Meanwhile, if hydraulic pressure is no longer supplied to the lock-up oil chamber 34, the lock-up piston 33 operates to a release side with an elastic force caused by a return spring (not illustrated), and the multi-disc lock-up clutch 3 is brought into a release state.

The automatic transmission 4 is a stepped transmission, and includes a plurality of hydraulic frictional engagement elements and planetary gear devices. In the automatic transmission 4, it is possible to selectively establish plurality of gear stages (shift stages) by selectively engaging a plurality of frictional engagement elements. As illustrated in FIG. 1, an input shaft 41 of the automatic transmission 4 is coupled to the turbine shaft 26 of the torque converter 2. An output gear 42 of the automatic transmission 4 is coupled to driving wheels 6 via the differential device 5 or the like.

The automatic transmission 4 includes a first clutch C1 to a fourth clutch C4, a first brake B1, and a second brake B2 as the hydraulic frictional engagement elements, for example, as illustrated in FIG. 2. By controlling engagement and release of the four clutches C1 to C4 and the two brakes B1 and B2, gear stages (a first speed gear stage "1st", second "2nd" to eighth speed gear stages "8th") of eight forward speeds and a gear stage (reverse gear stage "Rev") of one reverse speed are achieved. The engagement or release among the clutch C1 to the clutch C4, the brake B1, and the brake B2 is controlled by the hydraulic pressure control circuit 100.

Next, the hydraulic pressure control circuit 100 will be described with reference to FIG. 3. In addition, only a hydraulic circuit configuration of the torque converter 2 and the multi-disc lock-up clutch 3 is illustrated in FIG. 3.

First, although not illustrated, the hydraulic pressure control circuit 100 of this example is equipped with an oil pump, a primary regulator valve, a secondary regulator valve, and the like, the hydraulic pressure generated by the oil pump is regulated the primary regulator valve, and line pressure PL is generated. Secondary pressure Psec is regulated by the secondary regulator valve with the line pressure PL as original pressure.

The hydraulic pressure control circuit 100 illustrated in FIG. 3 is equipped with a linear solenoid valve (SLU) 101, a solenoid valve (SL) 102, a lock-up relay valve 103, a circulation modulator valve 104 (hereinafter referred to as a Cir-MOD valve 104), and the like.

The linear solenoid valve (SLU) 101 outputs the control hydraulic pressure, which has regulated the line pressure PL supplied to an input port 101*a*, from an output port 101*b* according to a command (lock-up clutch instruction hydraulic pressure) from the ECU 200.

The solenoid valve (SL) 102 outputs signal pressure if the solenoid value is controlled to be turned ON by a command from the ECU 200. The Cir-MOD valve 104 outputs circulation modulator pressure (hereinafter referred to as Cir-MOD pressure) that has regulated the line pressure PL.

The lock-up relay valve 103 is a switching valve that operates depending on the signal pressure from the solenoid valve (SL) 102 and switches between supply and discharge paths for the hydraulic pressure.

The lock-up relay valve 103 is provided with a signal pressure input port 103*a*, an L/U pressure input port 103*b*, a secondary pressure input port 103*c*, and a Cir-MOD pressure input port 103*d*. Additionally, the lock-up relay valve 103 is provided with an L/U pressure output port 103*e*, a T/C pressure output port 103*f*, two discharge pressure input ports 103*g*, 103*h*, a cooling port 103*i*, and a discharge port 103*j*.

The signal pressure input port 103*a* is connected to the solenoid valve (SL) 102. The L/U pressure input port 103*b* is connected to the output port 101*b* of the linear solenoid valve (SLU) 101. The secondary pressure input port 103*c* is connected to the above secondary regulator valve. The Cir-MOD pressure input port 103*d* is connected to the Cir-MOD valve 104. The L/U pressure output port 103*e* is connected to the L/U input port 34*a* of the multi-disc lock-up clutch 3. The T/C pressure output port 103*f* is connected to the T/C input port 25*a* of the torque converter 2. The pressure output ports 103*g*, 103*h* are connected to the T/C output port 25*b* of the torque converter 2. The cooling port 103*i* is connected to a cooler (not illustrated).

Figure 4:
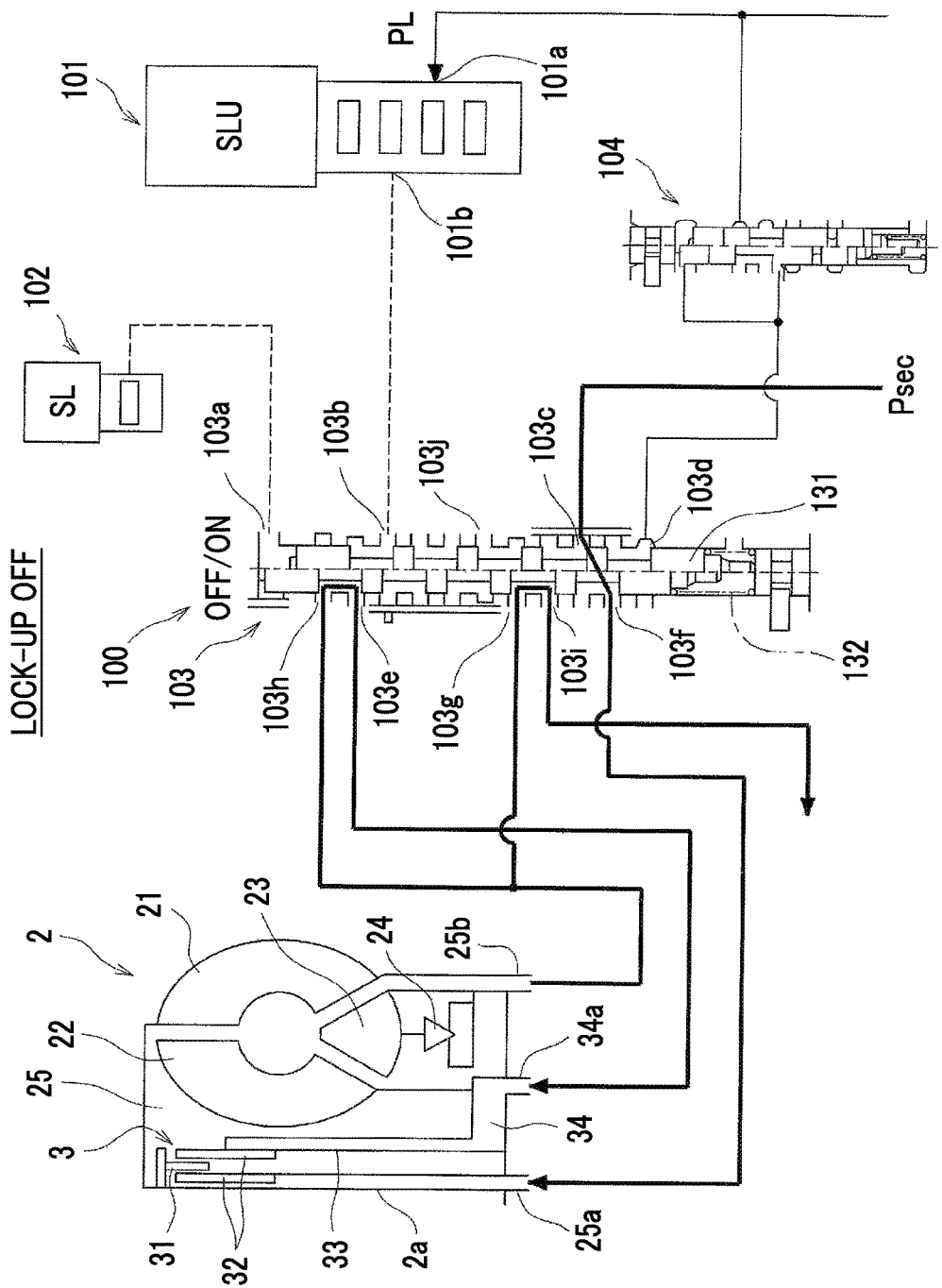
FIG. 4 is a view illustrating the operation during lock-up OFF in the hydraulic pressure control circuit of FIG. 3.

In the lock-up relay valve 103, when the signal pressure from the solenoid valve (SL) 102 is not input to the signal pressure input port 103*a* (in a lock-up OFF state), a spool 131 is disposed at an upper side position (the spool 131 is at a position illustrated on a left side in FIG. 3) of FIG. 3 by a biasing force of a spring 132. Accordingly, as illustrated in FIG. 4, the secondary pressure Psec is supplied to the T/C input port 25*a* (converter oil chamber 25) of the torque converter 2 via the lock-up relay valve 103. Additionally, the hydraulic oil that has circulated through the converter oil chamber 25 of the torque converter 2 is output from the T/C output port 25*b*, and flows into the two discharge pressure input ports 103*g*, 103*h*, respectively, of the lock-up relay valve 103. The hydraulic oil that has flowed into the discharge pressure input port 103*g* on a lower side in the drawing is supplied from the cooling port 103*i* to the cooler. Additionally, the hydraulic oil that has flowed into the discharge pressure input port 103*h* on an upper side in the drawing is input from the L/U pressure output port 103*e* to the L/U input port 34*a* of the multi-disc lock-up clutch 3.

Figure 5:
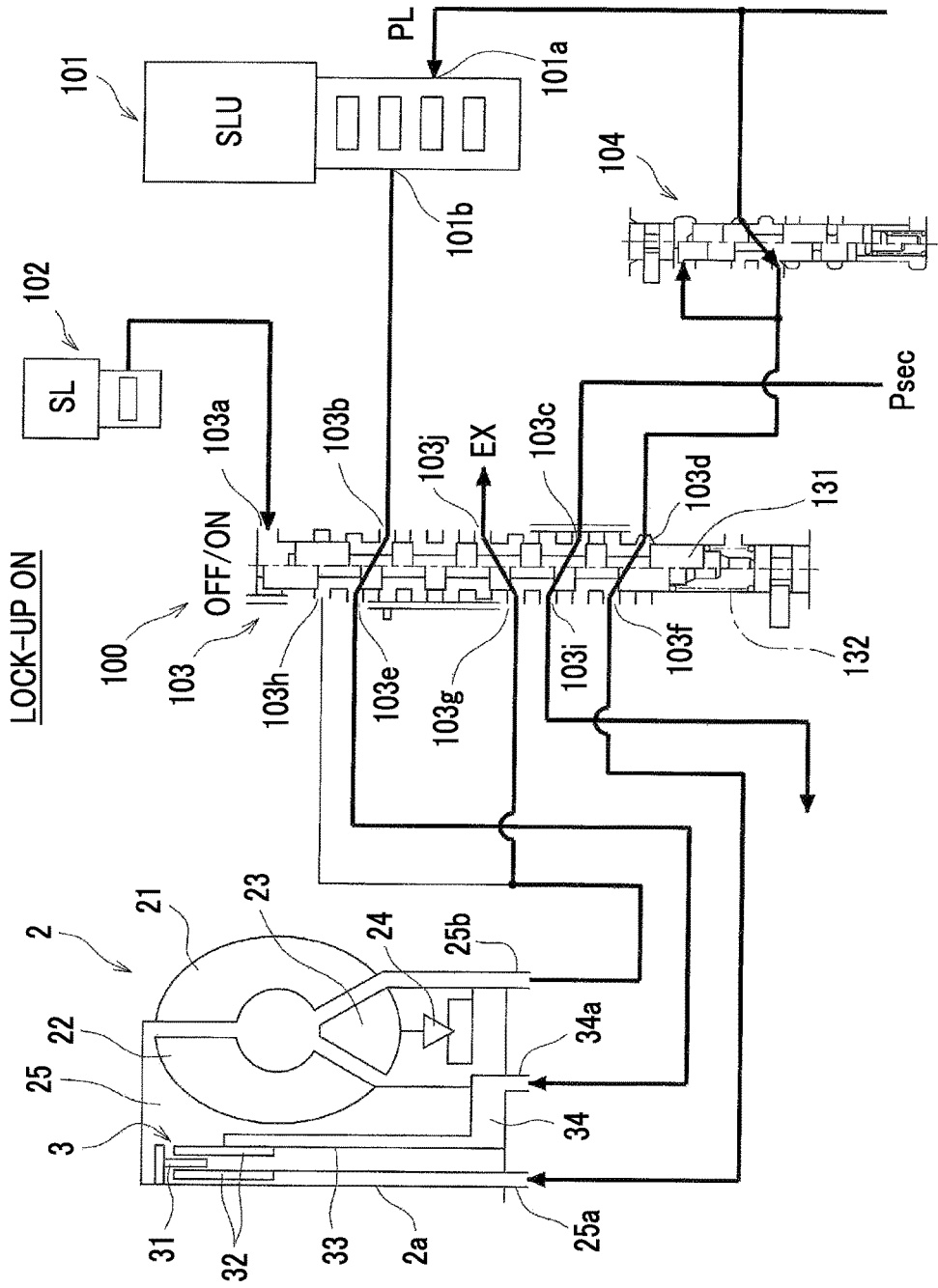
FIG. 5 is a view illustrating the operation during lock-up ON in the hydraulic pressure control circuit of FIG. 3.

Meanwhile, both the linear solenoid valve (SLU) 101 and the solenoid valve (SL) 102 are turned ON by a command from the ECU 200. As a result, if the signal pressure from the solenoid valve (SL) 102 is input to the signal pressure input port 103*a* of the lock-up relay valve 103 (if a lock-up ON state is brought about), the spool 131 moves to the lower side against the biasing force of the spring 132, and is disposed at a position (the spool 131 is at a position illustrated on a right side in FIG. 3) on the lower side of FIG. 3. Accordingly, as illustrated in FIG. 5, the Cir-MOD pressure from the Cir-MOD valve 104 is supplied to the T/C input port 25*a* (converter oil chamber 25) of the torque converter 2 via the lock-up relay valve 103. Additionally, the hydraulic oil that has circulated through the converter oil chamber 25 of the torque converter 2 is output from the T/C output port 25*b*, flows into the discharge pressure input port 103*g*, on the lower side of the drawing, of the lock-up relay valve 103, and is discharged from the discharge port 103*j*. Moreover, the control hydraulic pressure output from the linear solenoid valve (SLU) 101 is supplied to the L/U pressure input port 103*b* (lock-up oil chamber 34) of the multi-disc lock-up clutch 3 via the lock-up relay valve 103.

The ECU 200 is equipped with a central processing unit (CPU), a read only memory (ROM), a random access memory (RAM), a backup RAM, and the like.

Various control programs, maps referred to when executing these various control programs, and the like are stored in the ROM. The CPU executes calculation processing on the basis of the various control programs and the maps that are stored in the ROM. Additionally, the RAM is a memory that temporarily stores calculation results in the CPU, data input from respective sensors, and the like, and the backup RAM is a nonvolatile memory that stores data to be saved during the stop of the engine 1, or the like.

Figure 6:
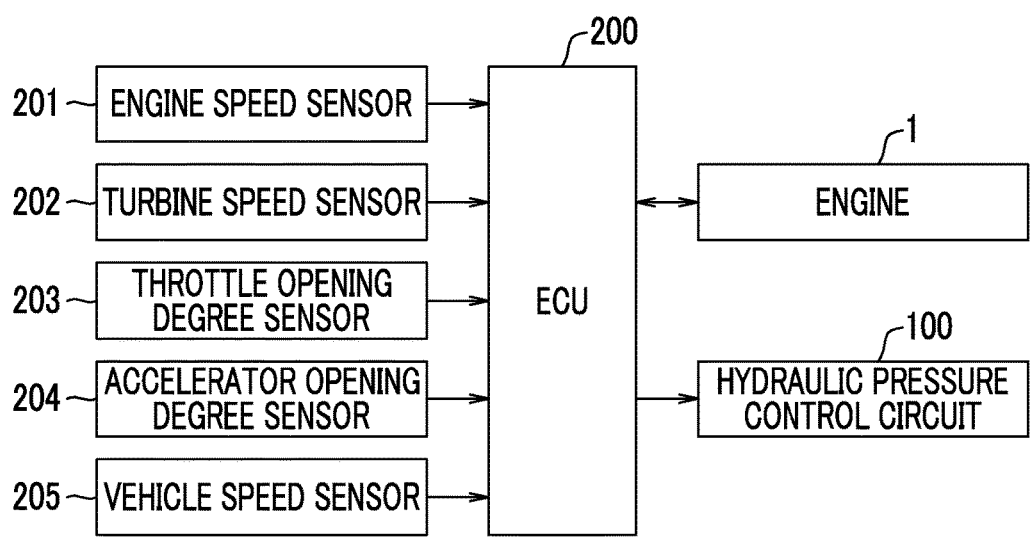
FIG. 6 is a block diagram illustrating the configuration of a control system, such as an ECU.

As illustrated in FIG. 6, the engine speed sensor 201, the turbine speed sensor 202, a throttle opening degree sensor 203 that detects the throttle opening degree of a throttle valve (not illustrated), an accelerator opening degree sensor 204 that detects an accelerator opening degree that is the amount of stepping of an accelerator pedal (not illustrated), various sensors, such as a vehicle speed sensor 205 that outputs a signal according to the vehicle speed of the vehicle 300 are connected to the ECU 200, and signals from these respective sensors (also including switches) are input to the ECU 200.

The ECU 200 is configured to be able to control an operational state of the engine 1 by controlling the throttle opening degree, the amount of fuel injection, ignition timing, and the like, on the basis of the detection results or the like of the various sensors.

The ECU 200 executes shift control of the automatic transmission 4, hydraulic pressure control of the above-described torque converter 2, and engagement control (full engagement control or slip engagement control) of the multi-disc lock-up clutch 3 by controlling the hydraulic pressure control circuit 100. Additionally, the ECU 200 executes lock-up clutch engagement hydraulic pressure learning control. Moreover, the ECU 200 can also execute the control of temporarily limiting (prohibiting) lock-up clutch engagement control.

During the shift control of the automatic transmission 4 to be executed by the ECU 200, for example, a target shift stage is obtained with reference to a shift map on the basis of a vehicle speed obtained from an output signal of the vehicle speed sensor 205 and an accelerator opening degree obtained from an output signal of the accelerator opening degree sensor 204, and the target shift stage and a current shift stage (for example, recognized from a current shift command to the hydraulic pressure control circuit 100) are compared with each other, and it is determined whether or not a shift operation is required. Depending on the result of the above determination, in a case where there is no need for shift (in a case where the current shift stage is the same as the target shift stage and the shift stage is appropriately set), the current shift stage is maintained without outputting a shift command to the hydraulic pressure control circuit 100. On the other hand, in a case where the target shift stage is different from the current shift stage, shift is performing by outputting a shift command to the hydraulic pressure control circuit 100 so as to bright about the target shift stage.

In addition, the above shift map is a map on which the vehicle speed and the accelerator opening degree are used as parameters, and a plurality of regions for obtaining proper gear stages (the gear stages 1st to 8th having optimal efficiency) are set according to the vehicle speed and the accelerator opening degree, and is stored within the ROM of the ECU 200. A plurality of shift lines (up-shift lines and down-shift lines for partitioning respective shift regions of 1st to 8th) for partitioning the respective regions are set on the shift map.

In addition, the hydraulic pressure control circuit 100 and the ECU 200 that performs the above shift control is an example of "shift control means" of the embodiment.

The ECU 200 performs the lock-up clutch engagement hydraulic pressure learning control. The lock-up clutch engagement hydraulic pressure learning control will be described with reference to FIG. 7.

Figure 7:
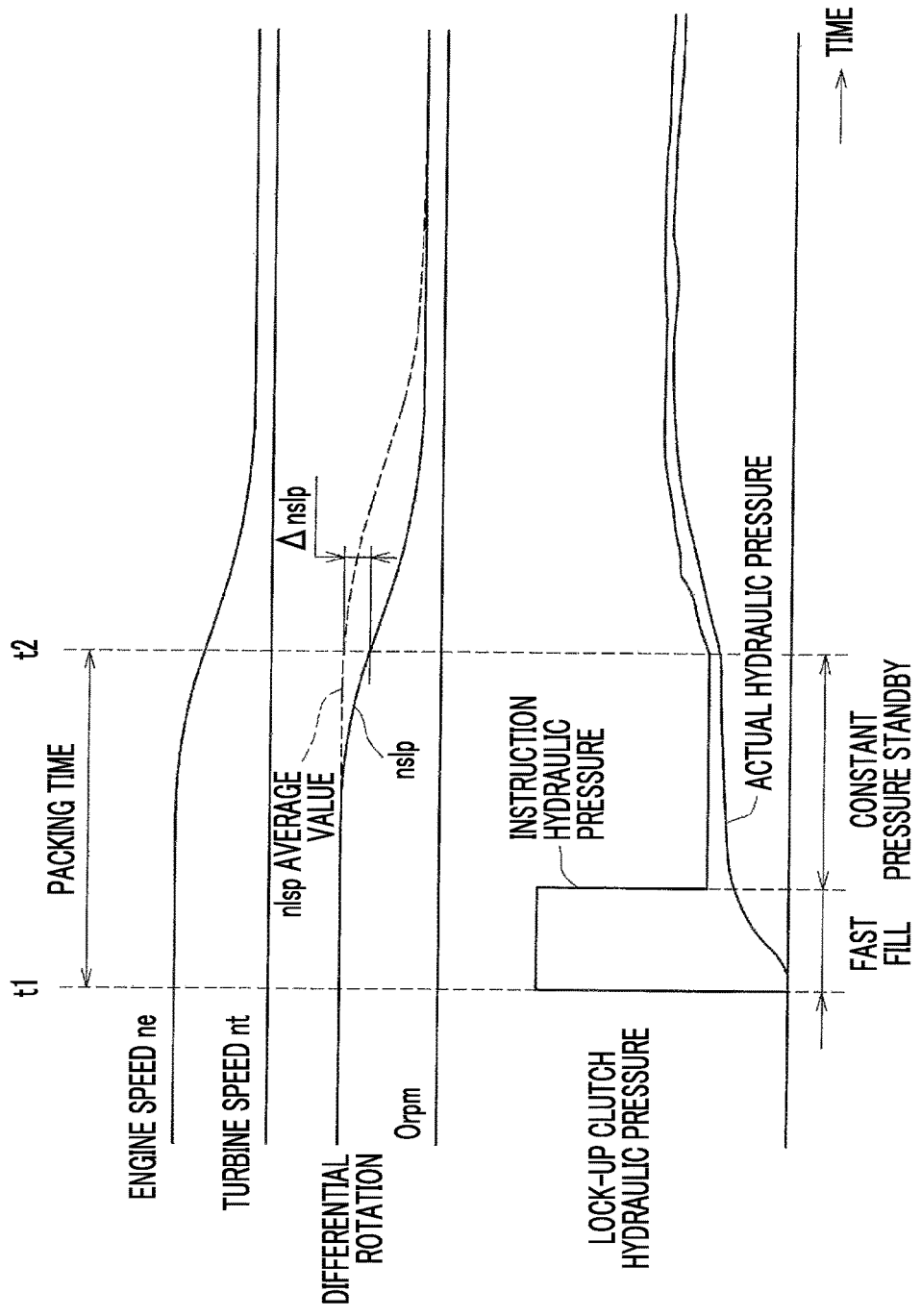
FIG. 7 is an explanatory view of lock-up clutch engagement hydraulic pressure learning control.

First, in the lock-up clutch engagement control, as illustrated in FIG. 7, fast fill of temporarily increasing lock-up clutch hydraulic pressure is executed, after this fast fill, packing (processing brought into a state immediately before being brought into the engaged state) of the multi-disc lock-up clutch 3 is performed by lowering the lock-up clutch hydraulic pressure and keeping a predetermined constant standby pressure for a given time.

The pack learning control (lock-up clutch engagement hydraulic pressure learning control) of learning such packing is the control of learning the lock-up clutch hydraulic pressure such that the packing time from the start of the packing (the start of the fast fill) to the packing becomes a target time. Specifically, as illustrated in FIG. 7, a packing time point (engagement start time point) t2 is determined from the change rate (inclination) of a differential rotation (a differential rotation between the engine speed ne and turbine speed nt) nslp, a packing time (t1 to t2: differential rotation change start time) from a time point t1 when the packing has started to a packing time point t2 is measured, and the lock-up clutch hydraulic pressure is learned such that the packing time becomes the target time.

Specifically, in a case where the packing time coincides with the target time, the lock-up clutch hydraulic pressure that has performed the packing is used as a learning value of the engagement hydraulic pressure. On the other hand, in a case where the packing time is longer than the target time, according to a difference between the target time and the packing time, the learning value of the lock-up clutch engagement hydraulic pressure is made to be a higher value as the time difference is larger. Additionally, in a case where the packing time is shorter than the target time, according to a difference between the target time and the packing time, the learning value of the lock-up clutch engagement hydraulic pressure is made to be lower value as the time difference is larger.

Here, regarding the determination of the above packing time point (engagement start time point), a time point (the time point t2 of FIG. 7) when a difference Δnslp between the differential rotation nslp (a solid line of FIG. 7) between the engine speed ne obtained from the output signal of the engine speed sensor 201 and the turbine speed nt obtained from the output signal of the turbine speed sensor 202 and an average value (an nslp average value: dashed line of FIG. 7) of differential rotations nslp at every predetermined time (for example, 100 msec) becomes equal to or higher than a predetermined threshold value is determined to be the packing time point (engagement start time point).

Next, the lock-up clutch engagement control to be executed by the ECU 200 will be described.

First, as described above, in a case where the shift control and the lock-up clutch engagement control overlap each other in the execution timing, if the lock-up clutch engagement control is delayed with respect to the shift control (the lock-up clutch engagement control is started after the completion of the shift control), a decrease in the fuel efficiency performance and the direct steering feeling resulting from the delay occurs whenever shifting is performed. However, since the lock-up clutch engagement control is executed after the execution of the shift control is completed, fluctuation of a turbine speed become small, and disturbance over the lock-up clutch engagement hydraulic pressure learning control during the lock-up clutch engagement control can be suppressed.

Meanwhile, if the lock-up clutch engagement control is executed during the shift control, the fuel efficiency performance and the direct steering feeling are improved. However, since the lock-up clutch engagement hydraulic pressure learning control accompanying the lock-up clutch engagement control and the shift control overlap each other, and the turbine speed fluctuates during the shift control, the lock-up clutch engagement hydraulic pressure learning control may be unable to be precisely performed.

In order to solve such a point, the start timing of the lock-up clutch engagement control with respect to the shift control is appropriately controlled in the present embodiment, so that a decrease in the fuel efficiency performance and the direct steering feeling can be suppressed while guaranteeing the precision of the lock-up clutch engagement hydraulic pressure learning control.

Figure 8:
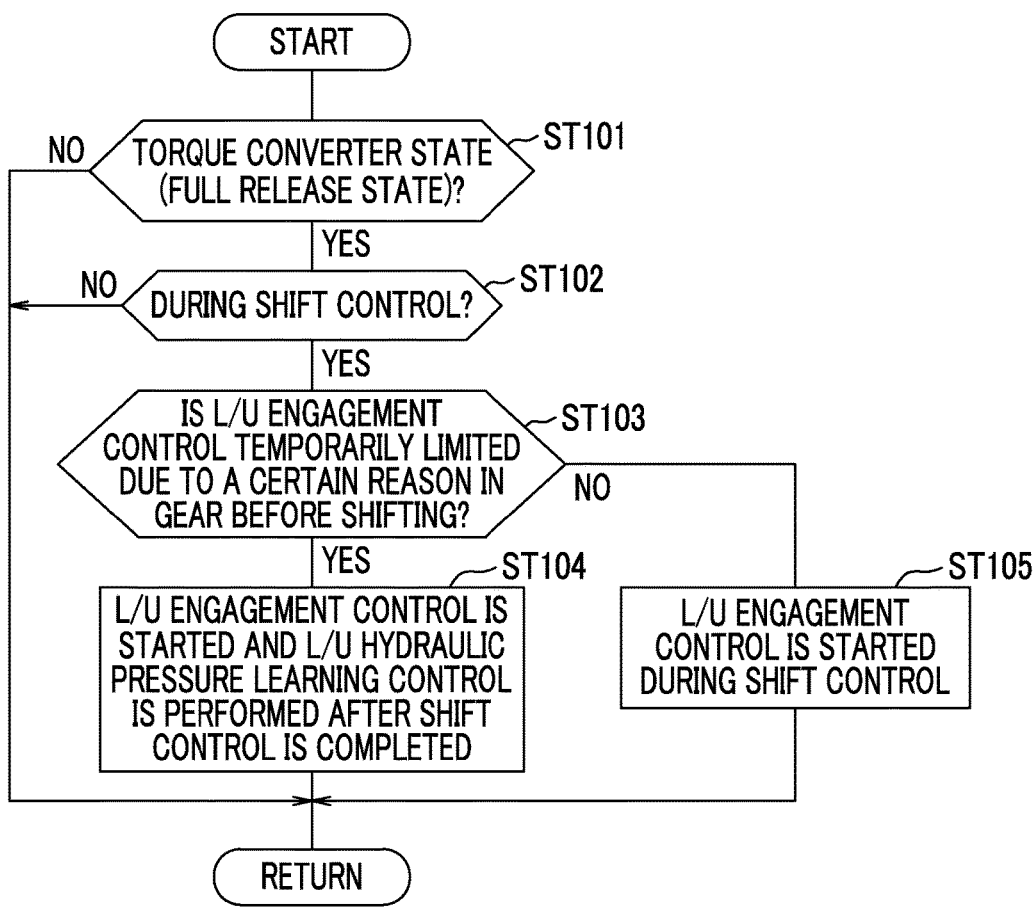
FIG. 8 is a flowchart illustrating an example of lock-up clutch engagement control to be excited by the ECU.

An example of the control will be described with reference to a flowchart of FIG. 8. A control routine of FIG. 8 is repeatedly executed at every predetermined time (for example, 4 msec) in the ECU 200. In addition, in the following description, the lock-up clutch engagement control is also referred to as "L/U engagement control", and the lock-up clutch engagement hydraulic pressure learning control is also referred to as "L/U hydraulic pressure learning control".

If the control routine of FIG. 8 is started, first of all, in Step ST101, it is determined whether or not there is in a torque converter state (the multi-disc lock-up clutch 3 is in a full release state). In a case where the determination result is negative determination (NO), a return is made. In a case where the determination result of Step ST101 is positive determination (YES), the processing proceeds to Step ST102.

In Step ST102, it is determined whether or not there is during the shift control. In a case where the determination result is negative determination (NO), a return is made. In a case where the determination result of Step ST102 is positive determination (YES) (in a case where there is during the shift control), the processing proceeds to Step ST103.

In Step ST103, it is determined whether or not the L/U engagement control is temporarily limited due to a certain reason in a gear stage (for example, a gear stage 1st) before shifting. In a case where the determination result of Step ST103 is positive determination (YES), the processing proceeds to Step ST104.

Figure 9:
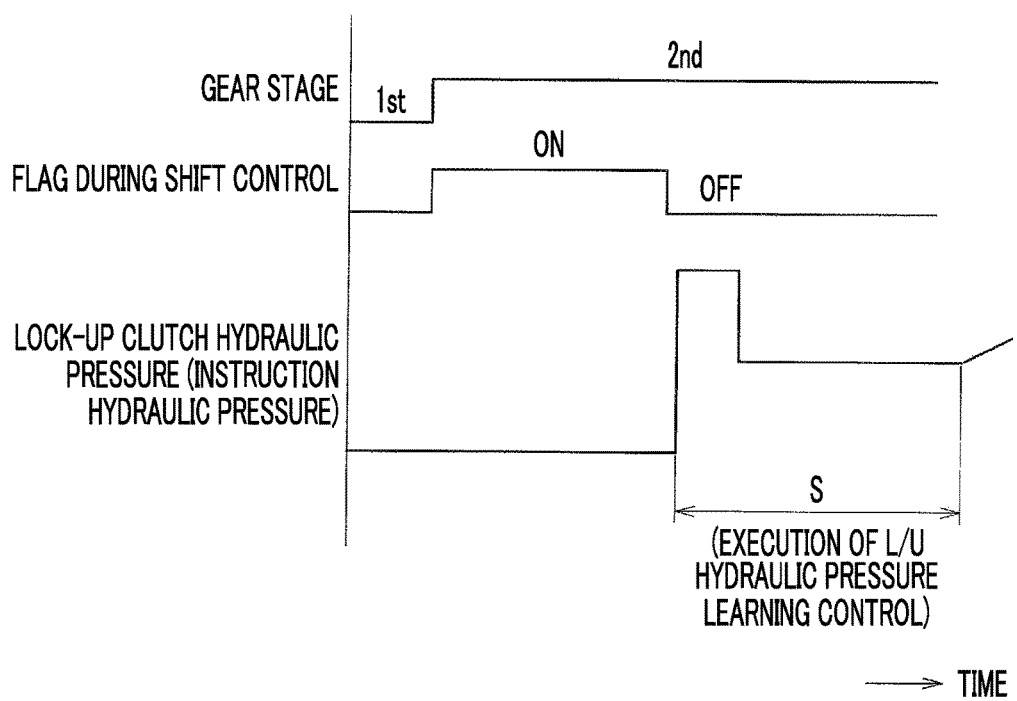
FIG. 9 is a timing chart illustrating timings at which the lock-up clutch engagement hydraulic pressure learning control is executed.

In Step ST104, after the execution of the shift control is completed, the L/U engagement control is started, and the L/U hydraulic pressure learning control is executed. Thereafter, a return is made. If the control of this Step ST104 will be described, for example, using a timing chart illustrated in FIG. 9, the L/U engagement control is not started when a flag during shift control showing during shift control for 1st→2nd shift is ON, and the L/U engagement control is started after the flag during shift control is turned OFF. Moreover, the L/U hydraulic pressure learning control (the learning control in the region S illustrated in FIG. 9) is executed with the start of this L/U engagement control. Then, after the L/U engagement control is delayed and executed with respect to the shift control as described above (after the L/U hydraulic pressure learning control is executed), the L/U engagement control during the shift control in a state where the L/U hydraulic pressure learning control is completed is executed.

On the other hand, in a case where the determination result of the above Step ST103 is negative determination (NO), that is, in a case where the L/U engagement control is not limited, the processing proceeds to Step ST105.

In Step ST105, the L/U engagement control is started during the shift control. Thereafter, a return is made. In addition, in the L/U engagement control during the shift control, the L/U hydraulic pressure learning control is not performed, or updating of an L/U hydraulic pressure learning value is not performed.

As described above, according to the present embodiment, in a case where the L/U engagement control is temporarily limited under some conditions in a gear stage (1st) before the shift control, the L/U engagement control is executed after the execution of the shift control (1st→2nd shift control) is completed, and the L/U hydraulic pressure learning control is executed. Thus, an execution region for the L/U hydraulic pressure learning control can be guaranteed, and the L/U hydraulic pressure learning control can be precisely performed. Moreover, since the L/U engagement control is not necessarily delayed at every shift control, a decrease in the fuel efficiency performance and the direct steering feeling can be minimized. Accordingly, it is possible to make guarantee of the precision of the L/U hydraulic pressure learning control compatible with suppression of the decrease in the fuel efficiency performance and the direct steering feeling.

In addition, when Step ST101 to Step ST105 of FIG. 8 are executed by the ECU 200, "lock-up clutch engagement control means" and "lock-up clutch engagement hydraulic pressure learning control means" of the embodiment are realized.

Next, another example of the L/U engagement control will be described with reference to a flowchart of FIG. 10. A control routine of FIG. 10 is repeatedly executed at every predetermined time (for example, 4 msec) in the ECU 200.

Figure 10:
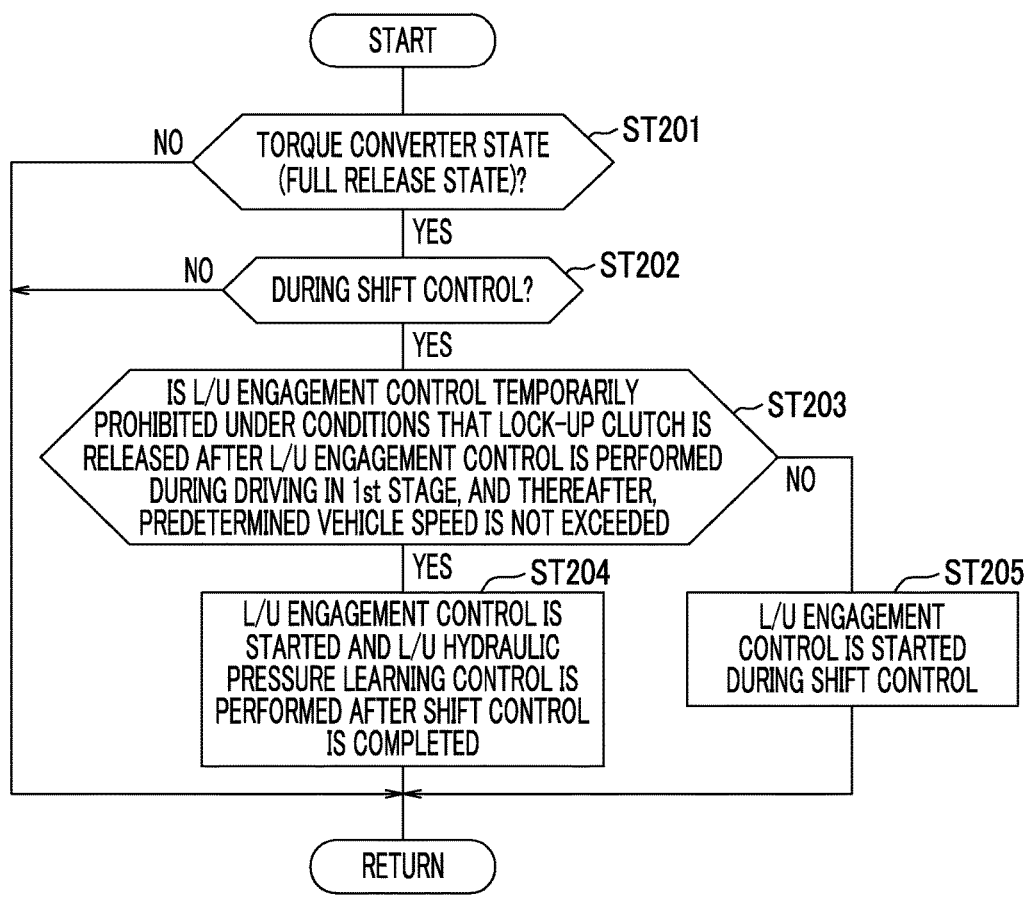
FIG. 10 is a flowchart illustrating another example of the lock-up clutch engagement control to be excited by the ECU.

If the control routine of FIG. 10 is started, first of all, in Step ST201, it is determined whether or not there is in a torque converter state (the multi-disc lock-up clutch 3 is in the full release state). In a case where the determination result is negative determination (NO), a return is made. In a case where the determination result of Step ST201 is positive determination (YES), the processing proceeds to Step ST202.

In Step ST202, it is determined whether or not there is during the shift control. In a case where the determination result is negative determination (NO), a return is made. In a case where the determination result of Step ST202 is positive determination (YES) (in a case where there is during the shift control), the processing proceeds to Step ST203.

In Step ST203, it is determined whether or not the L/U engagement control is temporarily prohibited under the conditions that congestion is assumed before the shift control. Specifically, after the L/U engagement control (possible in any case of the full engagement control or the slip engagement control) is performed during driving in the gear stage 1st before the shift control, the multi-disc lock-up clutch 3 is released, and thereafter, it is determined whether or not the L/U engagement control is temporarily prohibited under the conditions that the predetermined vehicle speed (for example, 10 km/h) is not exceeded (under the conditions that congestion is assumed). In a case where the determination result is positive determination (YES) (in a case where the L/U engagement control is limited during the gear stage before the shift control), the processing proceeds to Step ST204.

In Step ST204, after the execution of the shift control is completed, the L/U engagement control is started, and the L/U hydraulic pressure learning control is executed. Thereafter, a return is made. Then, after the L/U engagement control is delayed and executed with respect to the shift control in this way (after the L/U hydraulic pressure learning control is executed), the L/U engagement control during the shift control in a state where the L/U hydraulic pressure learning control is completed is executed.

On the other hand, in a case where the determination result of the above Step ST203 is negative determination (NO), that is, in a case where the L/U engagement control is not limited, the processing proceeds to Step ST205.

In Step ST205, the L/U engagement control is started during the shift control. Thereafter, a return is made. In addition, in the L/U engagement control during the shift control, the L/U hydraulic pressure learning control is not performed, or updating of an L/U hydraulic pressure learning value is not performed.

According to this embodiment, when acceleration is made in a situation where congestion is assumed, the L/U engagement control is delayed till the completion of the shift control only at the time of first shift control, and the L/U hydraulic pressure learning control is executed. Thus, the L/U hydraulic pressure learning control can be precisely performed. Then, since the L/U engagement control is executed during the shift control after such L/U hydraulic pressure learning control is performed, a decrease in the fuel efficiency performance and the direct steering feeling can be minimized.

As another example in which the L/U engagement control is temporarily limited (prohibited), there may be L/U engagement control limit in which the L/U engagement control is temporarily prohibited in a gear stage in which feeling has occurred in a case where the feeling has occurred due to a certain cause. Additionally, for example, if the multi-disc lock-up clutch 3 continues being engaged in a case where driving is performed on an uphill road in the gear stage 2nd, there may be L/U engagement control limit in which the L/U engagement control is temporarily prohibited in the gear stage 2nd in a case where there is a concern that the clutch plate (frictional engagement plate) may be damaged.

Moreover, as other examples, in a case where the number of times of vehicle stop is equal to or more than a predetermined number of times within a predetermined period, and stop and start (S&S: idling stop control) are prohibited, there may be L/U engagement control limit in which the L/U engagement control is temporarily prohibited under the conditions of actuation of an automatic brake by cruise control, actuation of an automatic electric parking brake (EPB), or an automatic P range selective state.

In addition, the embodiment disclosed this time is merely illustrative in all respects, and does not become a basis for limited interpretation. Hence, the technical scope of the invention is not interpreted by only the above-mentioned embodiment, and is defined on the basis of the statement of the claims. Additionally, all changes in meanings and scope equivalent to those of the claims are included in the technical scope of the invention.

For example, in the above embodiment, the lock-up oil chamber 34 of the multi-disc lock-up clutch 3 is disposed within the torque converter 2. However, the invention is not limited to this. The invention can also be applied to a configuration in which the lock-up oil chamber of the multi-stage lock-up clutch is disposed outside the torque converter.

Although an example in which the control device of the invention is applied to the multi-disc lock-up clutch mounted on an FF (front engine front drive) type vehicle is shown in the above embodiment, the invention is not limited to this and can also be applied to a control device for a lock-up clutch mounted on a FR (front engine rear drive) type vehicle or a four-wheel-drive type vehicle.

The invention can be effectively utilized for the control of the multi-disc lock-up clutch provided in the transmission for a vehicle.

What is claimed is:
1. A control device for a multi-disc lock-up clutch provided in a transmission of a vehicle, the control device comprising
   an electronic control unit configured to
   i) perform shift control of the transmission,
   ii) perform engagement control of the multi-disc lock-up clutch,
   iii) a) start the engagement control of the multi-disc lock-up clutch and b) perform a process to learn an engagement hydraulic pressure of the multi-disc lock-up clutch that causes the multi-disc lock-up clutch to reach a state immediately before an engaged state by a target time, after execution of the shift control is completed, when the shift control is executed in a state where the multi-disc lock-up clutch is released while the electronic control unit limits the engagement control of the multi-disc lock-up clutch in a shift stage before the execution of the shift control, and
   iv) start the engagement control of the multi-disc lock-up clutch and not perform the process to learn the engagement hydraulic pressure during the shift control when the shift control is executed in a state where the multi-disc lock-up clutch is released while the electronic control unit does not limit the engagement control of the lock-up clutch in a shift stage before the execution of the shift control.
2. The control device according to claim 1,
   wherein the electronic control unit is configured to
   v) release the multi-disc lock-up clutch after the engagement control of the multi-disc lock-up clutch is performed while the vehicle is traveling, and then
   vi) limit the engagement control of the multi-disc lock-up clutch when a vehicle speed is lower than a predetermined speed.
3. The control device according to claim 2,
   wherein the electronic control unit is configured to limit the engagement of the multi-disc lock-up clutch by prohibiting the engagement control of the multi-disc lock-up clutch.

* * * * *